June 23, 1931.  K. L. TATE  1,811,190

THERMOMETER

Filed Dec. 27, 1928

INVENTOR:
Kenneth L. Tate
BY
Alfred Burger
ATTORNEY

Patented June 23, 1931

1,811,190

UNITED STATES PATENT OFFICE

KENNETH L. TATE, OF ROCHESTER, NEW YORK, ASSIGNOR TO TAYLOR INSTRUMENT COMPANIES, OF ROCHESTER, NEW YORK, A CORPORATION OF NEW YORK

THERMOMETER

Application filed December 27, 1928. Serial No. 328,772.

This invention relates to thermometers having a glass stem defining a capillary bore containing mercury as the thermal indicating medium.

Heretofore devices of this type have been limited almost exclusively to constructions wherein the bulb and the stem are one integral piece of glass. It was heretofore considered impractical, if not practically impossible to provide glass thermometers of the distance thermometer type, i. e., thermometers comprising a glass stem of the usual form and a bulb removed a considerable distance away from the stem.

The reason for the general absence of distance glass thermometers in industrial and commercial application is probably due to the fact that for distance transmission a capillary tube of metal is required, which can be connected with the glass stem only with difficulty and by methods which are expensive and more or less unsatisfactory, since the coefficients of expansion of metal on the one hand, and of glass, on the other hand, differ widely, with the result that unequal expansion and contraction are a potential cause of destruction of the thermometer, and in fact, make the glass stem very susceptable to breakage.

It is the general object of this invention to provide a glass distance thermometer which is free from the objection referred to.

Another object of the invention is a glass distance thermometer which may be cheaply manufactured.

For a full understanding of the invention, its characteristic features and its execution, reference is made to the accompanying drawings which form part of the specification.

Figure 1:
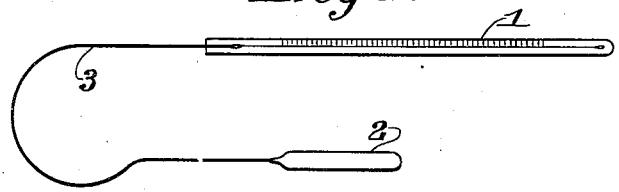
Fig. 1 is a face view of a thermometer embodying the invention.

In the drawings 1 represents the stem of a glass thermometer, 2 a bulb and 3 the capillary.

The capillary 3 is composed of two tubular bodies, an inner layer 3a and an outer layer 3b. The inner tube 3a is composed of some metal which is immune against the action of mercury and the outer tube 3b is of a metal so chosen that the resultant coefficient of expansion of the tube as a whole is substantially that of glass or, more in particular, of the glass of the stem.

While there is a certain degree of latitude as to the materials available for the purpose stated, I prefer invar steel as the metal for the inner tube and copper for the outer tube.

The proportion of invar and copper depends on various factors, such as the composition of the invar and the modulus of elasticity of the two metals and glass, respectively, but it is approximately 2:1 i. e., two parts of invar to one part of copper.

The capillary may be produced in several ways, as for instance by welding sheets of invar and copper together, cupping the compound sheet and drawings down to the required size or by welding a copper tube upon an invar rod, drilling the rod and drawings down to the required size.

The finished capillary is then attached to the glass stem much as the lead-in wire is embedded in incandescent light bulbs, the outer surface of the tubing being preferably coated with borax before the glass stem is pressed on to it in plastic condition.

In order to prevent contact between the mercury and copper, the capillary is so prepared that only invar is exposed to the mercury at the end of the capillary in the glass tube. This may be readily accomplished in various ways.

Figure 2:
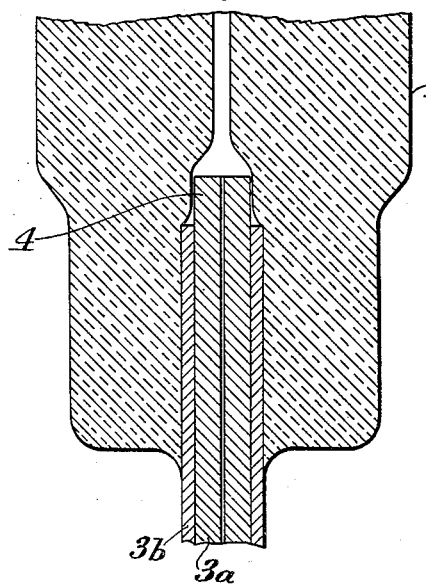
Fig. 2 is a fragmentary section, on an enlarged scale, showing the material part of the invention.

Having reference to Fig. 2, the end of the copper layer may be removed to expose the portion 4 of the layer 3a. When the capillary has been placed into the end of the stem and the glass is heated up and pressed around it, the operation may be so conducted as to force the glass over the end surface of the layer 3b and close to the surface of the exposed layer 3a, as indicated. Due to the surface tension of mercury, the latter does not flow into the minute clearance space which may be left between the layer 3a and the glass.

Figure 3:
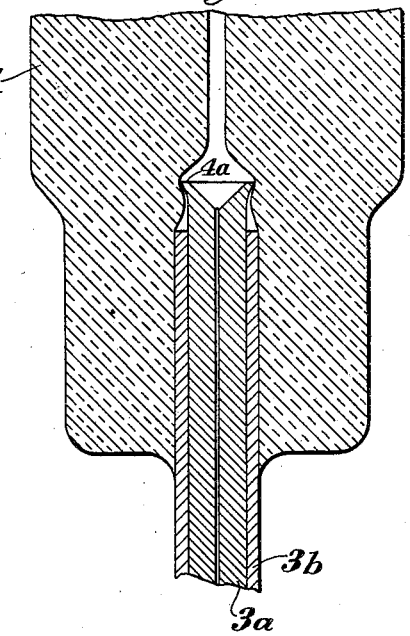
Fig. 3 is a similar view showing a modification of the form shown in Fig. 2.

As indicated in Fig. 3, the exposed layer 3a may be swaged outwardly to define a thin edge 4a. With this provision, the glass may be pressed practically into contact with the edge 4a, since upon contraction of the glass, the edge 4a yields sufficiently to avoid breakage of the glass. The edge 4a thus forms a seal against ingress of mercury into the space below the edg 4a and into contact with the copper layer.

Figure 4:
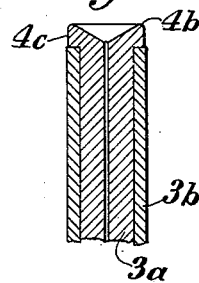
Fig. 4 is a sectional view of a detail showing another modification.

Fig. 4 shows the end of the layer 3a swaged or otherwise forced over the end surface of the layer 3a, except for a minute portion to leave a slight clearance between the glass and the surface 4c. The cap 4b thus formed substantially covers the end surface of the copper layer 3b and the mercury cannot come into contact with the latter.

The combination of metals for making the compound tubing should be such that the metal in contact with the glass has the property of wetting the latter.

I claim:

1. In a mercury thermometer, the combination of a glass stem having a capillary bore and terminating in an enlarged bore, a capillary tubing embedded in the enlarged bore, said tubing consisting of an inner layer of a metal immune to mercury and an outer layer of a metal of such character and such thickness relatively to the inner layer that the coefficient of expansion of the tubing as a whole is substantially that of the glass of the stem, the inner layer at the end of the tubing in the stem extending beyond the end of the outer layer and forming with the inner surface of the glass a seal against contact of the mercury with the outer layer.

2. In a mercury thermometer, the combination of a glass stem having a capillary bore and terminating in an enlarged bore, a capillary tubing embedded in the enlarged bore, said tubing consisting of an inner layer of a metal immune to mercury and an outer layer of a metal of such character and such thickness relatively to the inner layer that the coefficient of expansion of the tubing as a whole is substantially that of the glass of the stem, and means at the end of the tubing in the stem for preventing contact between the outer layer and the mercury.

In testimony whereof I affix my signature.

KENNETH L. TATE.

CERTIFICATE OF CORRECTION.

Patent No. 1,811,190.   Granted June 23, 1931, to

KENNETH L. TATE.

It is hereby certified that error appears in the printed specification of the above numbered patent requiring correction as follows: Page 1, lines 75 and 77, for the word "drawings" read drawing; and that the said Letters Patent should be read with these corrections therein that the same may conform to the record of the case in the Patent Office.

Signed and sealed this 4th day of August, A. D. 1931.

(Seal)

Wm. A. Kinnan,
Acting Commissioner of Patents.